United States Patent
Hiller et al.

(10) Patent No.: US 8,620,619 B2
(45) Date of Patent: Dec. 31, 2013

(54) ROTARY ENCODER COMPRISING INTERNAL ERROR CONTROL AND METHOD THEREFOR

(75) Inventors: Bernhard Hiller, Berlin (DE); Jochen Wilhelmy, Berlin (DE); Roland Kirchberger, Berlin (DE)

(73) Assignee: Baumer Hübner GmbH, Berlin (DE)

( * ) Notice: Subject to any disclaimer, the term of this patent is extended or adjusted under 35 U.S.C. 154(b) by 470 days.

(21) Appl. No.: 12/744,141

(22) PCT Filed: Nov. 4, 2008

(86) PCT No.: PCT/EP2008/009281
§ 371 (c)(1),
(2), (4) Date: Nov. 8, 2010

(87) PCT Pub. No.: WO2009/068156
PCT Pub. Date: Jun. 4, 2009

(65) Prior Publication Data
US 2011/0041585 A1 Feb. 24, 2011

(30) Foreign Application Priority Data
Nov. 26, 2007 (DE) .......................... 10 2007 057 376

(51) Int. Cl.
*G21C 17/00* (2006.01)
(52) U.S. Cl.
USPC ............ 702/183; 702/150; 702/182; 702/189
(58) Field of Classification Search
USPC .................................. 702/150, 182–183, 189
See application file for complete search history.

(56) References Cited

U.S. PATENT DOCUMENTS

| | | | | |
|---|---|---|---|---|
| 4,559,524 A * | 12/1985 | Suzuki | ............................ | 341/11 |
| 5,150,115 A * | 9/1992 | deJong et al. | ............ | 340/870.31 |
| 5,933,106 A * | 8/1999 | He et al. | ........................ | 341/116 |
| 2006/0025959 A1 | 2/2006 | Gomez et al. | | |
| 2006/0052973 A1* | 3/2006 | Hiller | ............................ | 702/150 |

FOREIGN PATENT DOCUMENTS

EP 0883249 A2 12/1998
WO 2004051192 A2 6/2004

OTHER PUBLICATIONS

International Search Report for PCT/EP2008/009281, 6 pages.

* cited by examiner

*Primary Examiner* — Mischita Henson
(74) *Attorney, Agent, or Firm* — McGlew and Tuttle, P.C.

(57) ABSTRACT

The invention relates to a rotary encoder comprising internal error control with a monitoring unit comprising at least a computing module, a verification means, a memory unit and an alarm unit. The invention also relates to a method for checking a rotary encoder when said encoder is in operation, the rotary encoder generating at least one measuring signal pair representative of the amount of rotation. In order to be able to determine the functioning of the rotary encoder, even when said rotary encoder is stationary, it is provided according to the present invention that a characteristic value should be created in the monitoring unit from current amplitude values of the measuring signal pair, said characteristic value being used in a comparison with at least one quality value representative of the functional states of the rotary encoder.

20 Claims, 10 Drawing Sheets

M1, AM1 = COS() -> R1, AR1
M2, AM2 = SIN() -> R2, AR2

| Sector | Relationship of amplitude values | Square wave signal | Examination |
|---|---|---|---|
| S1 | \|AM2\| < AM1 | R1 | AR2 larger than the upper expected value |
| S2 | \|AM1\| < AM2 | R2 | AR1 larger than the upper expected value |
| S3 | \|AM2\| < -\|AM1\| | R3 | AR2 smaller than the lower expected value |
| S4 | \|AM1\| < -\|AM2\| | R4 | AR1 smaller than the lower expected value |

ROTARY ENCODER COMPRISING INTERNAL ERROR CONTROL AND METHOD THEREFOR

The invention relates to a method for checking the operability of a rotary encoder, when said encoder is in operation, said method comprising comparing at least one pair of measuring signals, which are shifted in phase relative to one another and which are representative of an amount of rotation, such as an angular position of a shaft, with at least one reference information stored in the rotary encoder.

The invention further relates to a rotary encoder having integrated therein a sensor unit through which at least one pair of sinusoidal measuring signals, which are shifted in phase relative to one another, can be generated during operation, and a monitoring unit which is connected to the sensor unit in a measuring signal-transmitting manner and which is adapted to output, during operation, at least one monitoring signal representative of the operability of said rotary encoder.

Rotary encoders are generally known and are often used for determining a rotary angle value in the case of controlled drives. If an error occurs in the rotary encoder or in a signal-transmitting connection between the rotary encoder and a reception unit for the signals of said rotary encoder, it cannot readily be found out whether the source of error is to be searched for in the connection or in the rotary encoder or whether the rotary angle value monitored has changed unexpectedly.

An error in the connection may e.g. be a short-circuited signal transmission line. In the rotary encoder a plurality of potential error sources may exist. For example, movable or non-movable parts, such as magnets, light sources, sensors or incremental disks, may detach themselves from their intended position and may perhaps collide with one another. In addition, components in the rotary encoder may get dirty in the course of time or within a short period of time.

In many cases, the errors cause, already prior to a failure of the rotary encoder, changes in the measuring signals generated in the sensor unit. When the measuring signals, which are generated as sinusoidal signals and in pairs and which have a fixed phase relationship with each other, pass through signal processing components in the rotary encoder, these signal processing components may fail as well. Also other electrical, mechanical or thermal causes may lead to one of the above-mentioned error patterns.

In order to be able to identify an error source and to thus take effective countermeasures, EP 0 883 249 B1 and EP 1 006 663 B1 teach that the respective maximum values of the two amplitudes of the measuring signals, which change with the rotary angle value, are compared individually with predetermined maximum values. If, for example, a transparent area of an incremental disk gets dirty, the amplitude of the measuring signal will decrease and the previous maximum level of the measuring signal will no longer be reached.

When the measuring signals are converted into square wave signals, these square wave signals often have an amplitude which is, within certain limits, independent of the maximum achievable amplitude of the measuring signal underlying the square wave signal. Hence, EP 1 006 663 B1 teaches that the adequate functioning of a signal processing unit or a signal converter forming square wave signals from sinusoidal measuring signals can be determined on the basis of the number or sequence of the rectangles or of the edges of the square wave signal. A plurality of square wave signals can be combined such that the sequence of the rectangles or of their edges will have a predetermined pattern when there is a change in the rotary angle value, such as a rotation through an angle within a certain period of time. If the measurement deviates from this predetermined pattern, conclusions with respect to the error source can be drawn from this circumstance.

For identifying e.g. short-circuited signal lines, EP 1 006 663 B1 discloses that the output current of the rotary encoder is measured. It is shown that a low-ohmic resistor is connected in series with the signal line in the signal output. If an electric current flows through this resistor, a corresponding voltage will drop across the resistor according to Ohm's law, and this voltage is measured. If the flow of current increases due to a short circuit in e.g. an external signal transmission line, the voltage dropping across the resistor will increase as well; this is recognized and evaluated. Also an electric resistor, whose value of resistance increases as the temperature increases, may heat when the current flowing therethrough increases. The resistance value of this resistor will therefore increase, and this leads to a limitation of the flow of current. Also passive fuses may, for example, be used for interrupting, in the way described hereinbefore, signal transmission in the case of a short circuit.

However, the above-described courses of action have the disadvantage that the rotary encoder must rotate so as to allow the measurements to be carried out. On the one hand, the maximum amplitudes of the measuring signals are applied to e.g. the sensor unit only in exceptional cases, and, on the other hand, the number of edges of the square wave signal can only be counted if they are actually generated. Also to this end, the rotary encoder must rotate, i.e. the movable part, e.g. the incremental disk which is connected to the rotary shaft, must be rotated by the latter.

In addition, different signals, e.g. the sinusoidal measuring signals and the derived square wave signals, are evaluated in different ways. This increases the complexity and, consequently, the costs of a rotary encoder.

It is therefore the object of the present invention to provide a rotary encoder comprising internal error control and a method therefor, wherein the function of the rotary encoder can also be ascertained when a constant rotary angle value, e.g. a constant angular position, is applied to the rotary encoder.

As regards the method referred to at the beginning, the present invention achieves this object in that in the rotary encoder the amplitude values of the measuring signal pair are combined in a characteristic value, and that the characteristic value has associated therewith at least one reference information, which is stored in the rotary encoder as a quality value and which is representative of the admissible amplitude value combinations, and that a monitoring signal is outputted in dependence upon the quality value.

As regards the rotary encoder referred to at the beginning, the object is achieved in that the monitoring unit comprises a computing module by means of which a characteristic value can be generated from the measuring signal pair, a memory unit in which at least one quality value can be stored, a verification device by means of which a quality value can be associated with the characteristic value, and an alarm unit which is controllable in dependence upon the result of the association executed by the verification device and in which the monitoring signal can be generated.

These measures allow the function of the rotary encoder to be checked at any time when the rotary encoder is in operation, in particular also when it is stationary in any angular position, since amplitude values from which said characteristic value can be formed are always available.

The solution according to the present invention can be further improved by various embodiments which can be combined in an arbitrary manner and each individual of which is advantageous. These embodiments and the resultant advantages will be described in the following.

The amplitude values of the measuring signal pair can e.g. be combined with one another by means of an arithmetic function. If the measuring signal is present in the form of two sinusoidal signals which are shifted in phase by 90°, one of the measuring signal can be referred to as sinusoidal signal and the other one can be referred to as cosinoidal signal. When the arithmetic function comprises that the amplitude values of the measuring signals are squared and the results added, the sum obtained will be constant for all the rotary angle values that may occur when the rotary encoder is in operation.

Since the sum, which will be referred to as characteristic value in the following, is especially also constant when the rotary encoder is stationary, the rotary encoder does not need to carry out any relative movements for checking itself. If the amplitude value of one of the measuring signals is correct and has its maximum magnitude and if the amplitude value of the second measuring signal is also correct and equal to zero, a characteristic value representative of an adequate functioning of the rotary encoder will be ascertained also in this case. An impairment of e.g. an optical component participating in the generation of the second measuring signal may, however, not be recognizable in this case.

If the current amplitude values of the measuring signal pair, however, deviate from predetermined amplitude values and in particular if they are larger or smaller than the predetermined values, the characteristic value will change accordingly and allow conclusions with respect to defects or dirt within the rotary encoder.

A change of said one characteristic value may also be indicative of ageing or loosening of components participating in signal generation, such as LEDs or magnets, and of a resultant change in position of the components in question. An increase in the characteristic value may indicate that the above-mentioned loosened components may move towards one another or towards other components, and this may, in the final analysis, result in damage due to collision when the rotary encoder is in operation.

It may, however, also be possible that the rotary encoder is still functioning well even with impaired amplitude values of the measuring signal pair, since e.g. the parts with the maximum admissible tolerance cooperate. The characteristic values ascertained from such a rotary encoder may deviate from the ideal, constant characteristic value without an error existing. Hence, it will be of advantage when the characteristic values ascertained are compared with individual quality values stored in the rotary encoder. These quality values may be representative of an unimpaired function of the specific rotary encoder. Furthermore, additional quality values can be defined, which are representative of an only impaired function of the rotary encoder. It may, for example, happen that e.g. optical components get increasingly dirty during operation, so that a failure of the rotary encoder is foreseeable, although it is still functioning well at the moment. For this case, quality values can be provided, a value of which lies between a quality value representative of function failure and a quality value representative of unimpaired operability. Hence, quality values can be representative of a condition of the rotary encoder in which said rotary encoder no longer functions or is just still functioning.

In order to avoid the necessity of storing all the quality values that are possible, the quality values may be stored in the rotary encoder in the form of threshold values. Hence, it will suffice to check whether a characteristic value lies within an interval delimited by the threshold values.

The quality values can be ascertained in the rotary encoder itself, e.g. in a self-learning process. To this end, the characteristic values or a certain number of characteristic values can be collected and evaluated in the rotary encoder at a specific time, e.g. upon initial operation or upon servicing. In this way, changes which may occur in the measuring signals can be ascertained more precisely and expressed in the quality values.

Such a self-learning process may also make sense when the otherwise fault-free rotary encoder does not correspond to an ideal rotary encoder, i.e. when e.g. the measuring signals of a measuring signal pair have different maximum amplitudes or when their phase shift differs from predetermined values. One cause for this behaviour may reside in the use of differently shining LEDs or of detectors having different sensitivities or it may reside in the use of inaccurately manufactured or mounted material measures. This may e.g. be the case if the LEDs used having a different luminosity, if the detectors used have different sensitivities or if the incremental disk is perfectly manufactured or mounted.

In such a rotary encoder, a predetermined minimum number of characteristic values can be stored, e.g. when the rotary encoder is operated for the first time. These characteristic values are evaluated in the rotary encoder, and the quality values can then be derived on the basis of a predetermined likelihood of occurrence. The quality values are in this way calibrated to the individual rotary encoder.

In order to be able to adapt the quality values even more effectively to each rotary encoder, the quality values, and also the amplitude values of the measuring signal pair, can depend on the rotary angle value. A representation of the quality values of a perfect rotary encoder which, due to its simplicity, is particularly advantageous is obtained, when all the occurring amplitude values of the measuring signals of the measuring signal pair are plotted on a respective axis of a coordinate system. In this case, one of the measuring signals of the measuring signal pair may e.g. plotted on one axis, here referred to as X-axis, and the second measuring signal may be plotted on the second axis, here referred to as Y-axis. When the amplitude value vectors are added, characteristic values will be obtained, which form a ring for all characteristic values in the coordinate system, said ring having a radius whose absolute value corresponds to the sum of the squared amplitudes and a centre that coincides with the origin of the coordinate system.

If the amplitude values deviate from the perfect amplitude values already in the unimpaired condition of the rotary encoder or if the phase of the two signals of the measuring signal pair does not correspond to the predetermined values, the shape of the ring will change and become e.g. an ellipse. This can be taken into account when the rotary encoder is being calibrated.

Additional fluctuations or deviations of the measuring signals, which may be caused e.g. by soiling, enlarge in this mode of representation the width of the lines which are delimited by the ring or the ellipse, and quality value intervals are formed.

If a characteristic value deviates from the quality value unexpectedly, it will lie beside the enlarged boundary of the ring or of the ellipse comprising good quality values. Also in this case, a plurality of ring-shaped or elliptical-shaped areas, which can be represented by different quality values, may be representative of e.g. the functional states of the rotary encoder, including "good", "still good" or "poor".

If the measuring signal pair is processed e.g. in digitized form, the amplitude values thereof can be assigned to discrete representation values, e.g. in the form of binary digits. These representation values are again combined so as to form a characteristic value, which, in a further embodiment, is used as a characteristic value memory address. Under this characteristic value memory address, a value is stored, which is representative of the functional state of the rotary encoder, such as "good", "still good" or "poor", and which may e.g. have a different binary code, depending on the respective status. This value, which corresponds to the former quality value, is read from a digital memory and evaluated. The memory means may especially be part of the verification device.

A method for representing the digitized amplitude values, which, due to its simplicity, is particularly advantageous, is given when both representation values are used for addressing the columns and lines of a memory. The calculated memory address represents the characteristic value. In the address space of the memory, admissible quality values are again stored in the above-described elliptical-shaped ring or circular ring. The functional state of the rotary encoder corresponds to the content of the addressed memory location.

The characteristic value may also be calculated on the basis of some other combination of the two digitized amplitude values. For example, the "good" and the "still good" quality values may fill the whole address space of the memory. If the amplitude values represent a "poor" functional state of the rotary encoder, the characteristic value memory address can here lie outside of the defined region, since it is a "poor" quality value, and can be interpreted accordingly.

If the measuring signal pair is converted into a pair of square wave signals in the rotary encoder, also the function of a signal converter executing the conversion can be checked on the basis of the amplitude values of the two square wave signals. In so doing, the respective amplitude value of one of the two square wave signals is examined in comparison with a quality value. The shape of the square wave signals with amplitude values which are, at least sectionwise, substantially constant allows a process in which it is at least examined whether the square wave signal is either larger than an upper or smaller than a lower quality value.

Which square wave signal is examined in comparison with which quality value is decided in the monitoring unit in dependence upon the amplitude values of the measuring signal pair and the characteristic value, respectively. If the angular position changes, the amplitude values of the measuring signal pair as well as those of the pair of square wave signals will change accordingly. The signal pairs pass through four sectors delimited by sector boundaries. The sector boundaries can be defined by amplitude values of the measuring signal pair having identical magnitudes. Also other pairs of amplitude values of the two measuring signals of the measuring signal pair can be used for defining the sector boundaries.

Between two sector boundaries it can be determined, especially in dependence upon the ratio of the amplitude values of the measuring signal of the measuring signal pair, which of the square wave signals is examined in which way and in comparison with which quality value.

If the phase of the square wave signals is not equal to zero with respect to the measuring signals underlying the square wave signals, the sector boundaries can be shifted by this phase.

Since the amplitude values applied at the moment in question are, also in this case, used for checking the function of the rotary encoder or of the signal converter integrated in the rotary encoder, the check can also be carried out when the rotary encoder is stationary.

In order to identify also short-circuited signal transmission lines which, in the direction of signal flow downstream of the rotary encoder, connect the latter e.g. with an evaluation unit for rotary encoder signals, the amplitude values of the signals of the pairs of signals can be used also in this case. Since the rotary encoder outputs the measuring signal pair directly and/or as a pair of square wave signals derived from said measuring signal pair, it will be advantageous to apply the method described hereinbelow to both types of signals.

Due to short circuiting at least one of the signal transmission lines, the output voltage will collapse in a signal processing unit connected to the signal output. It may also be that the signal processing unit prevents transmission of the signal completely.

When, according to a further embodiment, the amplitude values of the signals are, downstream of the signal processing unit when seen in the direction of signal flow, combined individually or as a characteristic value in pairs and compared with the amplitude values or characteristic values of the associated signals or pairs of signals upstream of the signal processing unit, and when the signals downstream of the signal processing unit deviate more than expected from the signals upstream of the signal processing unit, the short circuit of at least one of the signal transmission lines can be detected.

When the rotary encoder generates more than one measuring signal pair and, consequently, possibly also more than one pair of square wave signals, the methods described here can be applied to each signal pair.

On the basis of the result of the comparison between the characteristic values or amplitude values and the quality values or other characteristic values or amplitude values, respectively, the rotary encoder can output the monitoring signal which depends on said result and which can be used e.g. for a visual display by means of at least one LED, which may also be multicoloured, or for transmission to a control unit, e.g. a PLC. The monitoring signal can represent e.g. the various functional states "good", "still good" or "poor".

A rotary encoder for executing the above-described method steps comprises a monitoring unit which is adapted to have supplied thereto at least one measuring signal pair and/or at least one pair of square wave signals. On the basis of the amplitude values of the signal pairs, the monitoring unit generates the monitoring signal representative of the function of the rotary encoder. For generating the monitoring signal, the monitoring unit comprises at least one computing module, a verification means, a memory unit and an alarm unit.

The computing module can be connected to the sensor unit in such a way that the measuring signal pairs can be transmitted to the computing module. If the measuring signal pairs are converted, e.g. into pairs of square wave signals, by the signal converter which is also provided in the rotary encoder, also these pairs of square wave signals can be transmittable to the computing module e.g. via separate signal lines. In the computing module, a characteristic value can be determined for each signal pair supplied to the module. The characteristic value can be transmitted via signal lines connecting the computing module with the verification means. If a plurality of characteristic values is to be transmitted, these characteristic values can be transmitted via separate lines or via a common line, e.g. as a multi-plex signal.

The verification device is preferably adapted to have supplied thereto at least one of the quality values from the memory unit, said quality value being then compared with the characteristic value by the verification device.

The verification device may also be adapted to have supplied thereto amplitude values, e.g. the pair of square wave signals, which can then be compared with the quality values in said verification device.

Also the memory unit can be adapted to have supplied thereto the characteristic values from the computing module as well as amplitude values, such as the amplitude values of the pair of square wave signals of the signal converter.

In the verification means, at least one verification signal can be generated e.g. on the basis of a comparison between at least one characteristic value and at least one quality value. This verification signal can be supplied to the alarm unit which is controllable by the verification signal. On the basis of the verification signal, one monitoring signal or more per verification signal can be generated in the alarm unit. The monitoring signals can be applied individually to a respective monitoring signal output or as at least two monitoring signals to at least one signal output of the alarm unit.

Furthermore, the monitoring unit may also comprise a signal comparison unit and an acceleration measuring device, said elements being, in turn, able to produce verification signals which can be supplied at least to the alarm unit. The signal comparison unit can be adapted to have supplied thereto the amplitude values of the measuring signal pairs and/or of the pairs of the square wave signals from the sensor unit or from the signal converter. In addition, the signal comparison unit can be adapted to have supplied thereto the signal pairs applied to the output of the rotary encoder. The signal comparison unit may also be integrated in the verification means.

The alarm unit can be connected directly to an error control display for displaying the functional state of the rotary encoder e.g. via at least one LED. Alternatively, the monitoring signal may also be transmittable to a data processing unit, such as a machine control unit or a monitoring signal processing unit. It is also possible that, instead of the monitoring signals, the verification signals are transmittable directly.

In the following, the invention will be explained exemplarily on the basis of embodiments making reference to the drawings. The various features of the embodiments can be combined independently of one another, as has already been stated in connection with the individual advantageous embodiments.

Figure 1:
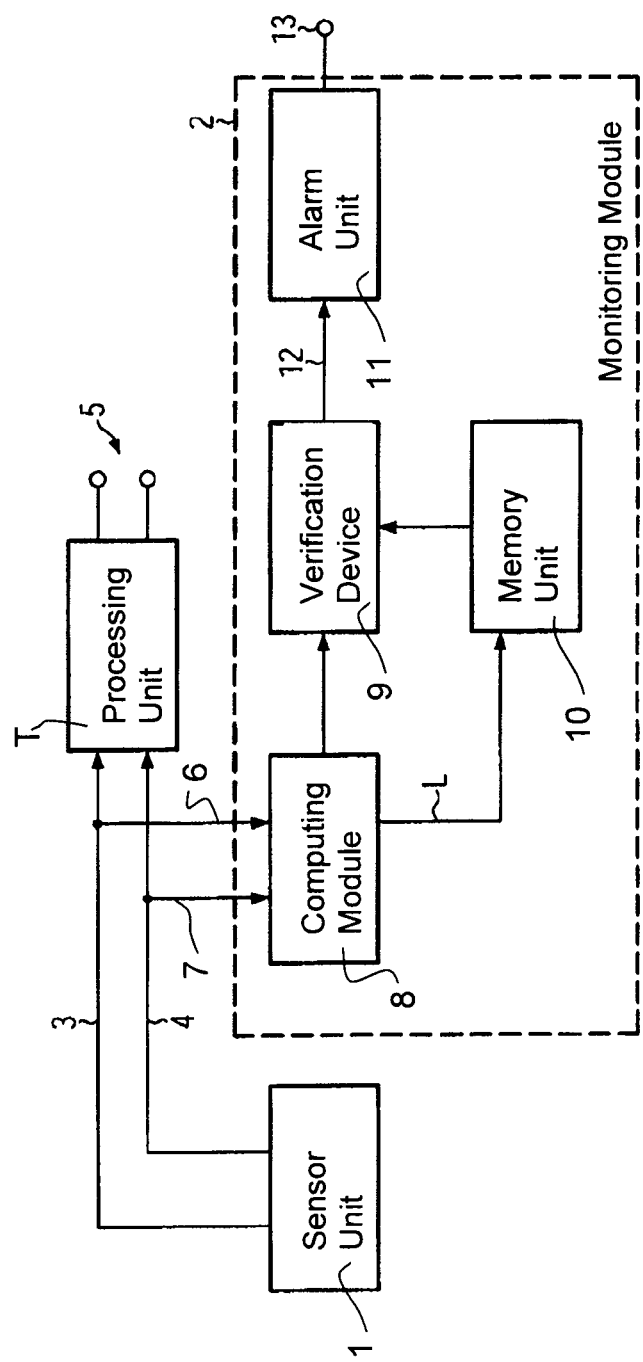
FIG. 1 shows a schematic representation of a first embodiment of the invention.

To begin with, the structural design and the function of a rotary encoder according to the present invention are described with reference to the embodiment according to FIG. 1. Said FIG. 1 shows schematically the structural design of a rotary encoder according to the present invention comprising a sensor unit 1 and a monitoring module 2.

The sensor unit 1 transmits a measuring signal pair P1 comprising two sinusoidal and phase-shifted measuring signals M1 and M2 via measuring signal lines 3, 4 and via an electronic signal processing unit T to the signal output 5 of the rotary encoder. A respective further line 6, 7 branches off from the two lines 3, 4, said further lines 6, 7 transmitting the measuring signal pair P1 to signal inputs of the monitoring unit 2.

The sensor unit may also be provided with separate signal outputs for outputting the measuring signal pair P1 to the signal input of the monitoring unit 2.

In the monitoring unit 2 the measuring signal pair P1 is first supplied to the measuring signal inputs of a computing module 8.

In said computing module 8 the measuring signal pair P1 has assigned thereto a characteristic value K, which is supplied to a memory unit 10 via a signal output of a verification device 9 and via a line L, i.e. the measuring signal pair is reduced to a characteristic value. Said characteristic value K is examined in the verification device 9 in comparison with expected characteristic values or quality values E stored in a memory unit 10, which communicates in a quality value-transmitting manner with the verification device 9.

A verification signal V representative of the result of this examination controls an alarm unit 11, which is also integrated in the monitoring unit 2 and the signal input of which has supplied thereto via a line 12 the verification signal V from the verification device 9. A signal output 13 of the alarm unit 11 has applied thereto a monitoring signal U which depends on the verification signal V.

Figure 2:
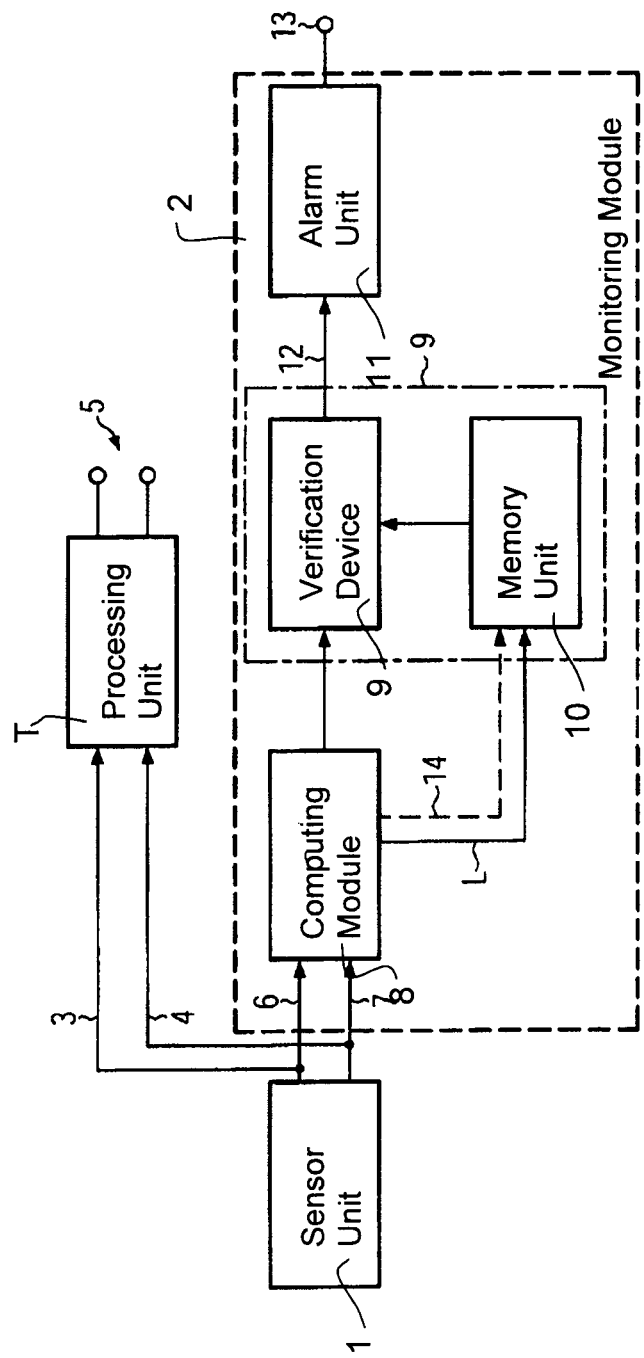
FIG. 2 shows a schematic representation of a further embodiment of the invention, which differs from the embodiment shown in FIG. 1 insofar as an additional line is provided between the computing module and the memory unit.

FIG. 2 shows a further embodiment; elements which correspond to the elements of the embodiment according to FIG. 1 with respect to function and structural design are here designated by the same reference numerals. For the sake of brevity, only the features which are different from those of the embodiment according to FIG. 1 will be discussed.

Here, the computing module 8 outputs, via an additional signal output, the characteristic value K also to the memory unit 10 which is connected to the computing module 8 via a line 14. However, said line 14 may also branch off from the line which interconnects the computing module 8 and the verification device 9 in a signal-transmitting manner, or it may be looped through the verification device 9 and then routed to the memory unit 10. The memory unit 10 may also be part of the verification device 9, as indicated by the dot-and-dash line.

Figure 3:
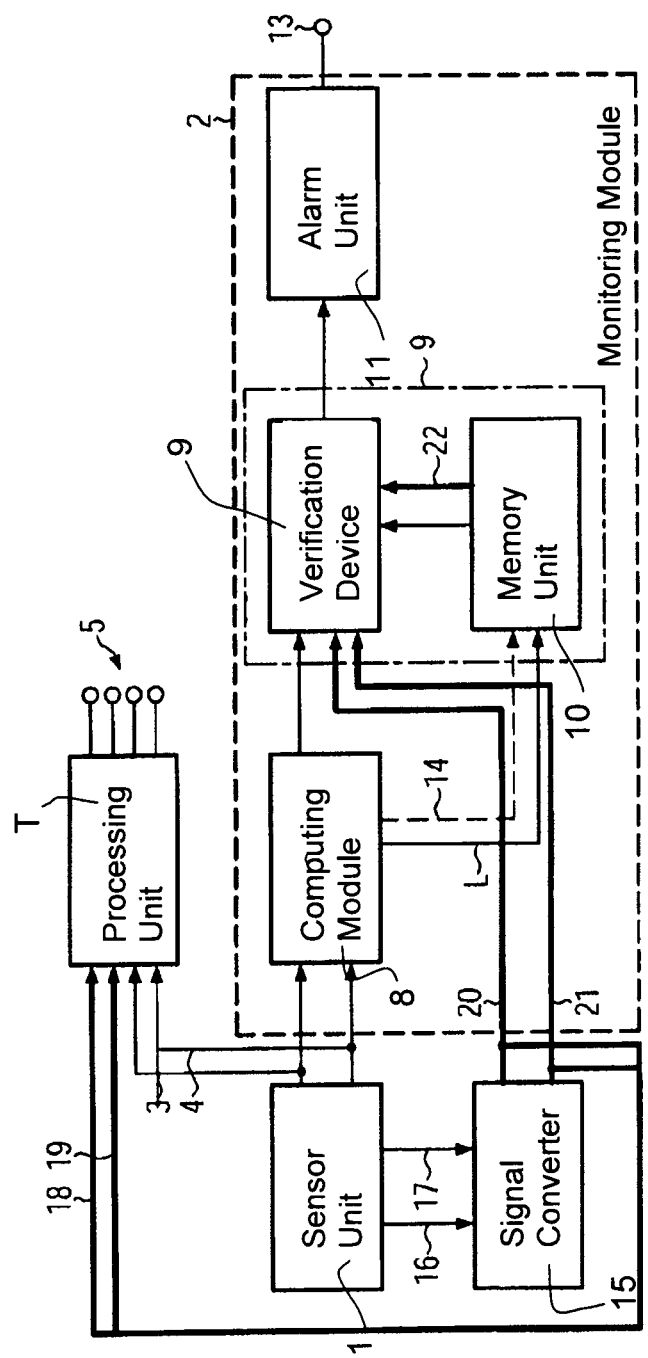
FIG. 3 shows a schematic representation of a third embodiment of the invention, which differs from the preceding embodiments insofar as an additional signal converter is provided.

FIG. 3 shows a third embodiment; elements which correspond to the elements of the embodiments according to FIGS. 1 and 2 with respect to function and structural design are here designated by the same reference numerals. For the sake of brevity, only the features which are different from those of the embodiments according to FIGS. 1 and 2 will be discussed.

In FIG. 3 a signal converter 15 is additionally shown, said signal converter 15 being integrated in the rotary encoder. The signal converter 15 has here supplied thereto the measuring signal pair P1 via separate measuring signal outputs of the sensor unit and via lines 16, 17. Said lines 16, 17 may also branch off from the lines 3, 4 which transmit the measuring signal pair P1 from the signal output of the sensor unit 1 to the signal output 5 of the rotary encoder.

In the signal converter 15 the sinusoidal measuring signal pair P1 is converted into a pair P2 of square wave signals R1, R2. The square wave signal pair P2 is supplied via lines 18, 19 to additional connections of the signal output 5 of the rotary encoder.

Here, two lines 20, 21 branch off from the lines 18, 19, a respective one of the square wave signals R1, R2 of the square wave signal pair P2 being supplied to the verification device via 9 said lines 20, 21.

Also in this case, a separate pair of signal outputs of the signal converter 15 may be connected to the signal output 5 of the rotary encoder, an additional pair of signal outputs being then directly connected to the verification device 9 via said lines 20, 21, so that also the square wave signal P2 can be output.

In order to allow an examination of the square wave signal pair P2 in the verification device 9, said verification device 9 has supplied thereto a second quality value E2 from the memory unit 10 via line 22.

Figure 4:
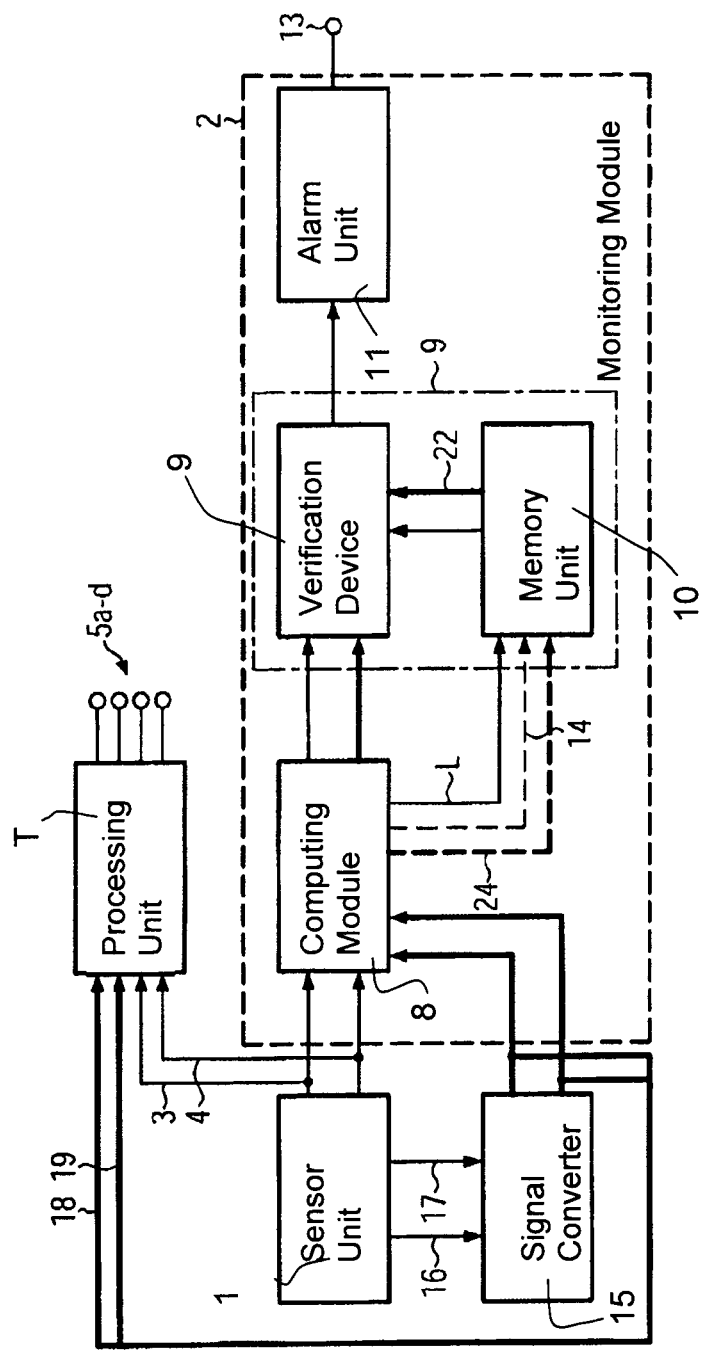
FIG. 4 shows a schematic representation of a fourth embodiment of the invention.

FIG. 4 shows a fourth embodiment; elements which correspond to the elements of the embodiments according to the preceding figures with respect to function and structural design are here designated by the same reference numerals. For the sake of brevity, only the features which are different from those of the embodiments according to the figures that have already been described will be discussed.

Here, lines 20, 21 connect the signal converter 15 not to the verification device 9 but to the computing module 8. A second characteristic value K2 is ascertained from the square wave signal pair P2 supplied to the computing module 8, said second characteristic value K being supplied to the verification device 9 via a separate line 23 and to the memory unit 10 via an additional line 24. A signal output of the computing module 8 can, of course, have connected thereto the verification device 9 as well as the memory unit 10.

Figure 5:
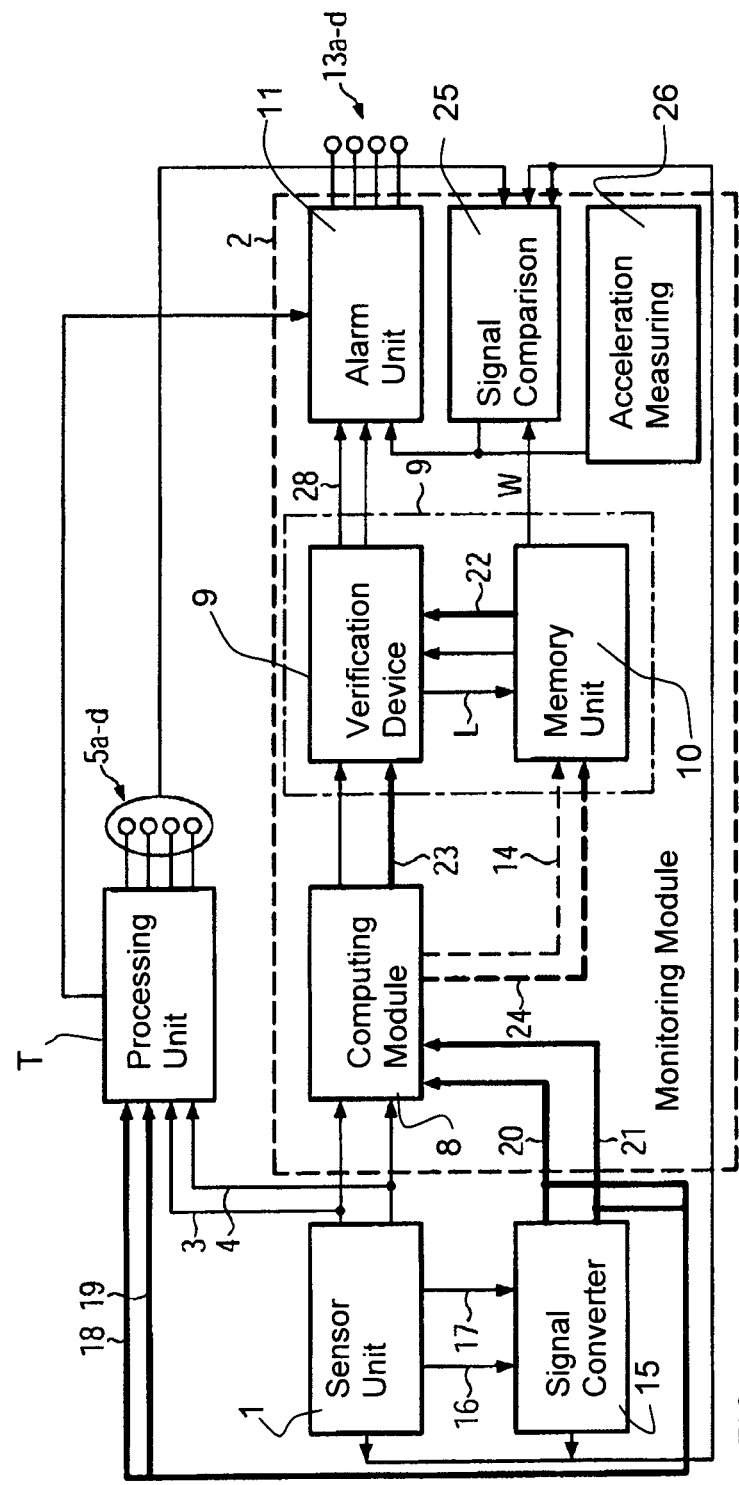
FIG. 5 shows a schematic representation of a fifth embodiment of the invention, in which the monitoring unit has added thereto a current monitoring unit and an acceleration measuring device.

A fifth embodiment is shown in FIG. 5; also in the case of this embodiment, elements which correspond to the elements of the embodiments according to the preceding figures with respect to function and structural design are designated by the same reference numerals. For the sake of brevity, only the features which are different from those of the embodiments according to the figures that have already been described will be discussed.

The monitoring unit 2 has here added thereto two further functional units, viz. a signal comparison unit 25 and an acceleration measuring device 26. Both said elements are connected to the alarm unit 11 via a common line. The verification signals generated here can, of course, also be supplied to a respective signal input of the alarm unit via separate lines.

The alarm unit 11 has supplied thereto four verification signals representative of the function of four functional units, and, for each of these signals, a monitoring signal U is here outputted at one of the signal outputs 13$a$-$d$ of the alarm unit 11.

The verification device 9 transmits, via line 12, a verification signal V1 representative of the function of the sensor unit 1 and, via line 28, a verification signal V2 representative of the signal converter 15 to the alarm unit 11.

Each of the signal outputs 13$a$-$d$ has applied thereto monitoring signals U a-d, which can be supplied to LEDs, by way of example. For example, three LEDs can be accessed for each of the functional units 1, 15, 25, 26 monitored, so that the operability of the functional units 1, 15, 25, 26 of the rotary encoder can be indicated e.g. via a green, a yellow and a red LED.

The monitoring signals U a-d can also be adapted to be transmitted to a data processing unit in which the state of the rotary encoder can be stored in a database and/or displayed on a screen.

In particular the verification signal of the signal comparison unit 25 can also be used for recognizing error sources outside of the rotary encoder. For example, a rise in temperature in the area of the signal processing unit T, which may comprise up to one output driver per signal output and at least one temperature sensor, may indicate that, e.g. due to a short circuit outside of the rotary encoder, an inadmissible high current flows through one of the signal outputs 5.

For recognizing this fault, it is possible to execute in the signal comparison unit 25, which is connected to the signal outputs 5$a$-$d$ of the sensor unit 1 and the signal converter 15 in a signal-transmitting manner, a comparison between the amplitude values AM1, AM2, AR1, AR2 of the signal pairs P1, P2 at the signal output 5$a$-$d$ and the amplitude values AM1, AM2, AR1, AR2 of the signal pairs P1, P2 applied to the signal outputs of the sensor unit 1 and/or the signal converter 15. In order to be able to execute this comparison, characteristic values K, K2 and/or information can be supplied to the signal comparison unit 25 from the computing module 8 for the selection of the square wave signal to be examined. In addition, quality values E, E2 can be supplied to the signal comparison unit 25 from the computing module 8. A verification signal representative of the result of the comparison can be outputted to the alarm unit 11.

The acceleration measuring device 26, which comprises e.g. a one-, two- or three-dimensional absolute acceleration sensor, is able to convert shocks or vibration into a further verification signal V, whereby e.g. collisions between components connected to the rotary encoder and other components, or other mechanical faults that generate mechanical vibrations, such as e.g. an incorrect mounting of the rotary encoder or defective ball bearings, can be recognized.

Figure 6:
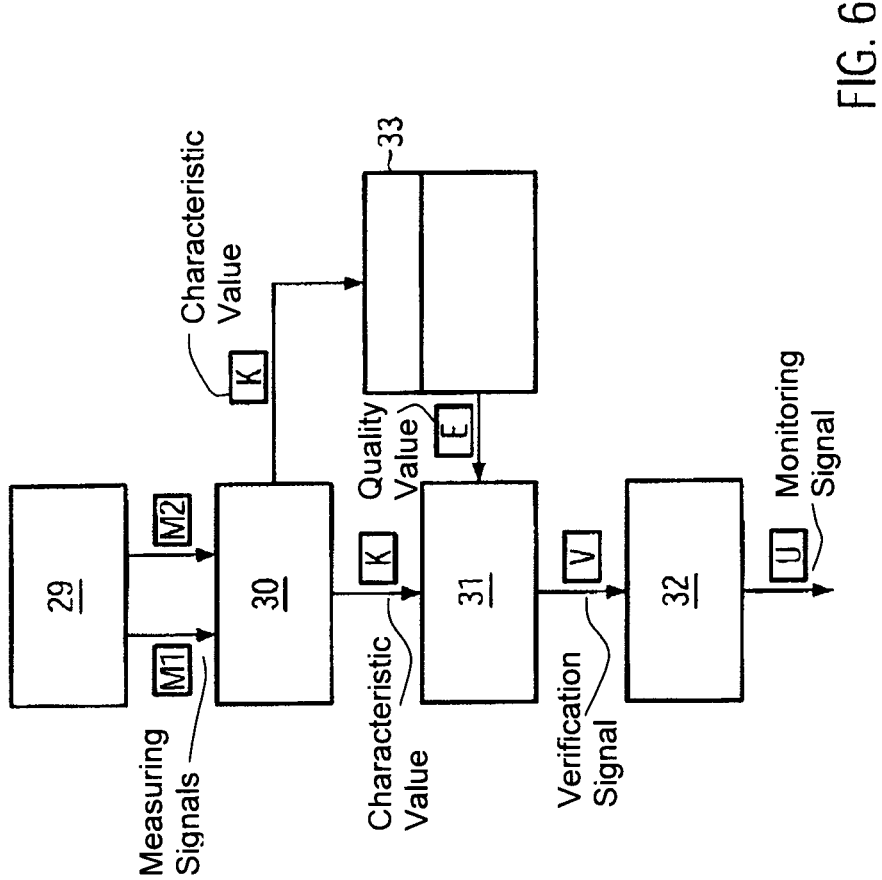
FIG. 6 shows a schematic representation of an embodiment of the method according to the present invention in the form of a flow chart.

FIG. 6 shows a sixth embodiment; also in the case of this embodiment, elements which correspond to the elements of the embodiments according to the preceding figures with respect to function and structural design are designated by the same reference numerals. For the sake of brevity, only the features which are different from those of the embodiments according to the figures that have already been described will be discussed.

The flow chart shown here illustrates the method for checking the operability of the rotary encoder on the basis of the measuring signal pair P1. The amplitude values of the measuring signals M1, M2 depending on the angular position $\phi$ have here e.g. the form $AM1=U\cos(k\phi)$ and $AM2=U\sin(k\phi)$, k being the number of increments. The current amplitude values AM1, AM2 of the measuring signal pair P1, which can be generated in step 29, can here be linked by an arithmetic function so as to obtain the characteristic value K in the characteristic value determination step 30. In the case of the above-mentioned angular function forms of the measuring signals M1, M2, the arithmetic function may e.g. comprise that squares of the amplitude values AM1, AM2 are summed up.

In a perfectly constructed and operating rotary encoder, the ideal characteristic value $Ki=(AM1)^2+(AM2)^2=U^2\cos^2(k\phi)+U^2\sin^2(k\phi)=U^2$ is constant at any moment of operation of the rotary encoder.

Due to functional deviations of the rotary encoder in the generation of the measuring signal pair P1 in step 29, which deviations may be caused e.g. by different light densities of the light sources or by a soiled sensor system used for optical rotary encoders, the ascertained characteristic value K may also deviate from the ideal, constant characteristic value Ki.

If the measuring signal pair P1, whose deviation from the ideal value causes the deviation of the characteristic value K from the ideal characteristic value Ki, is still good enough for guaranteeing an adequate functioning of the rotary encoder, a verification signal V can be generated upon verifying 31 the characteristic value K, said verification signal V being representative of the functional states of the rotary encoder. In method step 32, the monitoring signal U can be generated in dependence upon the verification signal V. It is also possible to use the verification signal V as a monitoring signal U.

If the deviation between the characteristic value K and the ideal characteristic value Ki is too large, so that the function of the rotary encoder can, for example, not be guaranteed for the future, the respective verification signal V can e.g. be used as a basis for outputting a monitoring signal U as a warning or servicing signal.

If the deviation between the characteristic value K and the ideal characteristic value Ki is too large, which may e.g. be caused by a measuring signal pair P1 with at least one insufficient amplitude AM1, AM2, a monitoring signal U can be emitted as an error signal on the basis of which e.g. a machine, in which the rotary encoder is installed, is impaired in function.

Instead of ascertaining the difference between the ascertained characteristic value K and the ideal characteristic value Ki, the characteristic value K may also be examined in comparison with characteristic value classes Ki, K+, K−. The characteristic value classes Ki, K+, K− define ranges which represent e.g. measuring signals M1, M2 having a "good", "still good" or "poor" quality.

In the embodiments of the figures which have been described so far, these characteristic value classes can be stored e.g. in the memory unit 10 as quality values E, E2 through which also the quality value intervals can be delimited.

For establishing individual quality values E, E2 for each rotary encoder, the characteristic values K ascertained in step 30 can be fed to a characteristic value collection and processing step 33, which can be executed in the computing module 8 or in the memory unit 10.

Characteristic values K which are collected in a specific period of time, e.g. upon initial operation or upon servicing, can be statistically evaluated in this step 33. The classification of the characteristic value classes Ki, K+, K− or quality values E can here be determined on the basis of a predetermined likelihood of occurrence.

In order to exclude, by way of example, that good quality values E ascertained in step 33 represent a measuring signal pair P1 with e.g. at least one insufficient amplitude value AM1, AM2, the quality values E ascertained can, for the purpose of checking, be compared with absolute limit values which may e.g. have been stored in the memory unit 10 in advance.

Figure 7:
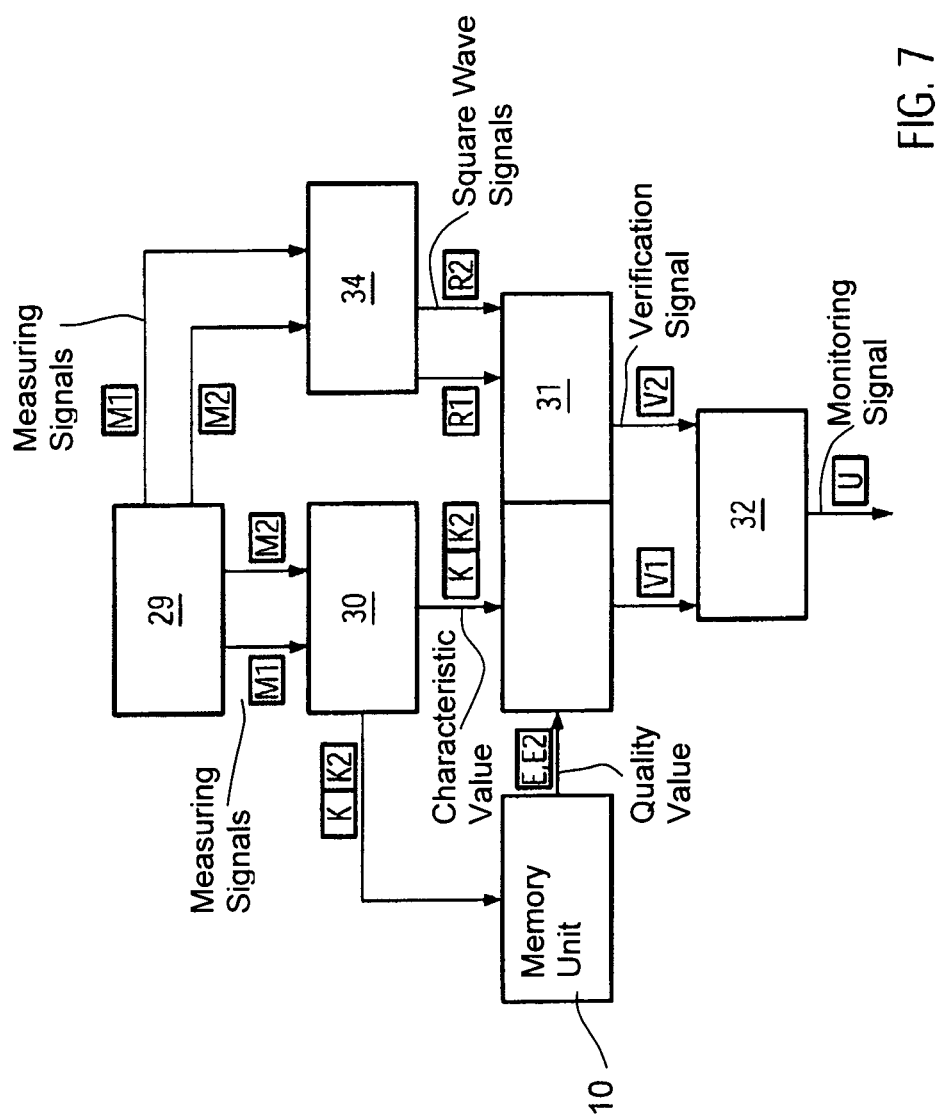
FIG. 7 shows a schematic representation of a further embodiment of the method according to the present invention in the form of another flow chart.

In the seventh embodiment shown in FIG. 7, elements which correspond to the elements of the embodiments according to the preceding figures with respect to function and structural design are again designated by the same reference numerals. For the sake of brevity, only the features which are different from those of the embodiments according to the figures that have already been described will be discussed.

The measuring signal pair P1 can here be converted into a pair of square wave signals P2 in a signal conversion step 34. Amplitude values AR1, AR2 of the square wave signals R1, R2 can here be fed directly to the verification step 31 as characteristic values.

In the verification step 31, at least one of the amplitude values AR1, AR2 of a pair of square wave signals P2 can be compared with at least one quality value E2. The selection of one of the square wave signals R1, R2 can be executed on the basis of the amplitude values AM1, AM2 of the measuring signal pair P1.

Rotary angle values at which the measuring signal pair P1 comprises measuring signals M1, M2 with amplitude values AM1, AM2 of identical absolute value delimit sectors S1 to S4 in which a respective one of the square wave signals R1, R2 is to be examined. In particular, it can be examined whether the amplitude value AR1, AR2 is larger or smaller than an upper or lower quality value E2.

If the square wave signals R1, R2 are shifted in phase relative to the measuring signals M1, M2, the sector limits will have to be shifted accordingly.

Figures 10, 11:
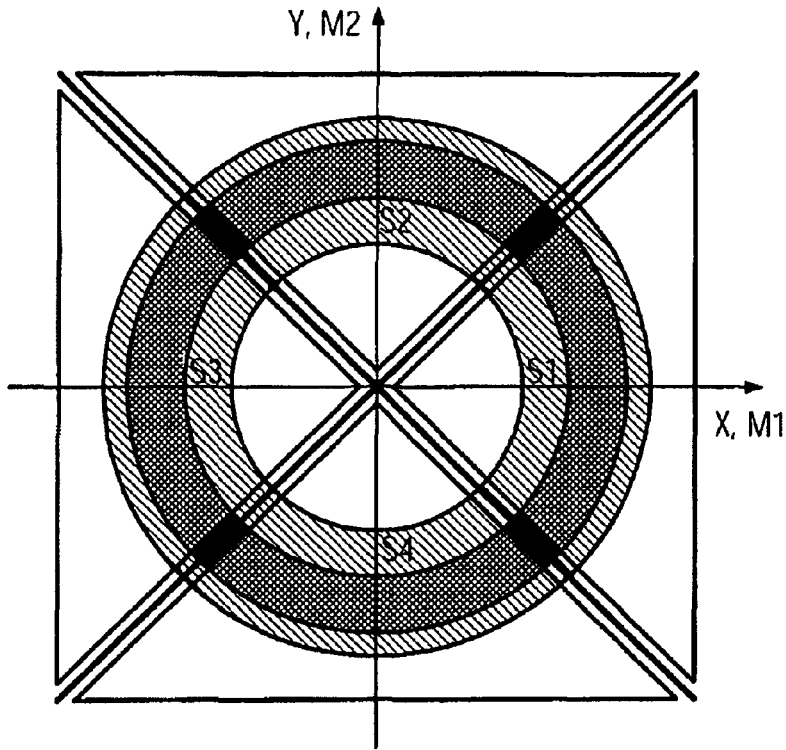
FIG. 10 shows a schematic representation of a further embodiment of the invention, in the case of which sectors have been added to the coordinate system.
FIG. 11 shows a table with sector definitions.

A table illustrating the selection of the square wave signal to be examined is shown in FIG. 11.

In the verification step 31, a second verification signal V2 is here generated, which is representative of "good", "still good" or "poor" amplitude values AR1, AR2 or other functional features also for the square wave signal pair P2 and on the basis of which the monitoring signal U can be generated.

The characteristic values K, K2 are here fed to the verification step 31 and to the memory unit 10.

Figure 8:
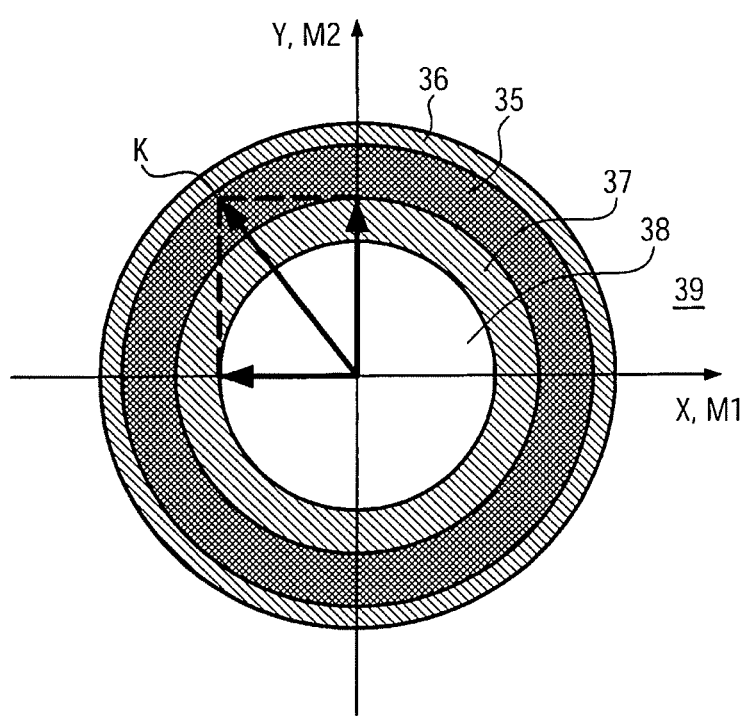
FIG. 8 shows a schematic representation of the quality values according to the present invention in a coordinate system.

An eighth embodiment is shown in FIG. 8; also in the case of this embodiment, elements which correspond to the elements of the embodiments according to the preceding figures with respect to function and structural design are designated by the same reference numerals. For the sake of brevity, only the features which are different from those of the embodiments according to the figures that have already been described will be discussed.

FIG. 8 shows a further method for ascertaining the characteristic value K from the amplitude values AM1, AM2. The characteristic value K can here be ascertained more easily, since the amplitude values AM1, AM2 need not be squared.

FIG. 8 shows a coordinate system comprising axes X and Y, which are arranged at right angles to one another and which both have the same scale. If a respective one of the amplitude values is plotted on these axes X and Y as a vector, in the present case e.g. amplitude value AM1 on the X-axis and amplitude value AM2 on the Y-axis, the sum vector will point to the characteristic value K. If the characteristic value K represents good amplitude values AM1, AM2, it will lie in a range of good quality values arranged in the quality value ring 35. Quality values E which are still good are represented by the quality value rings 36 and 37, poor quality values E lie outside of the regions 38 and 39.

The number of characteristic values stored can depend on the resolution of the participating ND converters, i.e. it may comprise a field of 1024×1024. Alternatively, parts of the ND converter may also be masked so as to reduce memory requirements.

For an individual calibration of the quality values E, E2 to a rotary encoder, a certain number of characteristic values K can be stored and evaluated in the rotary encoder. If e.g. 5000 characteristic values K are evaluated, this can be considered as a spot sample from a large number of possible characteristic values K. If the histogram of the 5000 characteristic values K has a normal distribution with a standard deviation, e.g. an upper and a lower quality value E, E2 can be determined, said upper and lower quality values E, E2 defining together e.g. the "still good" range for the characteristic values K. The quality values E, E2 may be spaced apart at a distance corresponding to six times the standard deviation of the characteristic values K. If a characteristic value K ascertained later on should lie outside of this range, the rotary encoder can output a monitoring signal U indicating this event.

If the histogram of the 5000 characteristic values K should have a different distribution, the quality values E will have to be ascertained in some other suitable way. Such a spot sample can also be ascertained and evaluated when the rotary encoder is being serviced. A change in phase between the measuring signals M1, M2 of the measuring signal pair P1 can also be detected when the rotary encoder is stationary.

During this self-learning process, quality values E, E2 of working, but not perfectly working rotary encoders, whose measuring signal pair P1 comprises e.g. measuring signals M1, M2 having different maximum amplitude values AM1, AM2, can be ascertained individually.

Figure 9:
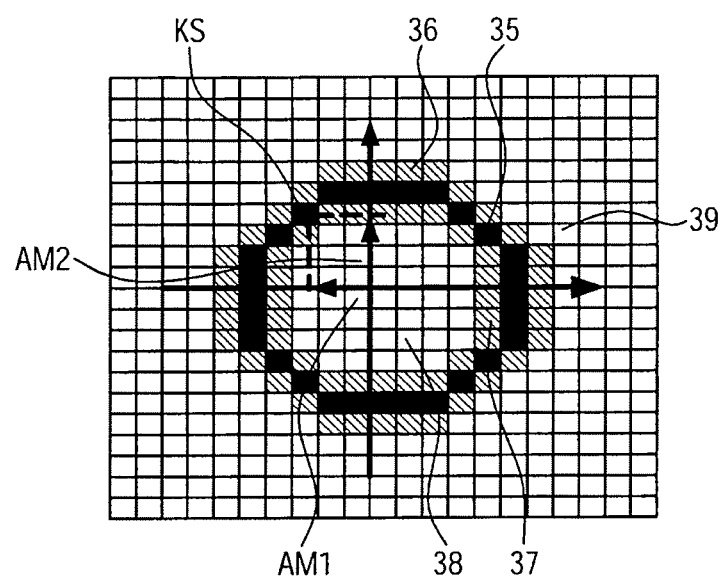
FIG. 9 shows a schematic representation of a further embodiment of the quality values according to the present invention, said embodiment differing from the preceding embodiments with respect to discrete quality values.

FIG. 9 shows a ninth embodiment; elements which correspond to the elements of the embodiments according to the preceding figures with respect to function and structural design are designated by the same reference numerals. For the sake of brevity, only the features which are different from those of the embodiments according to the figures that have already been described will be discussed.

The quality value rings 35 to 39 may also be imaged in an at least two-dimensional characteristic diagram, i.e. a digital memory by way of example. The digitized amplitude values AM1, AM2 correspond here to memory addresses which are adapted to be combined with one another for calculating a characteristic value memory address Ks. The characteristic value memory address Ks comprises preferably more than two states or more than one bit so as to be able to classify the quality values stored under this characteristic value memory address Ks as "good", "still good", "poor", etc., each status having assigned thereto one or more quality values E. If a classification as "good" and "poor" does suffice, this can also be represented in two states, e.g. as 0 or 1.

The digital amplitude values AM1, AM2 may also be combined in some other form, so that the quality values E are not imaged in the memory as quality value rings 35 to 39. For example, the quality values E2 which are at least still good may, together with the good quality values E, occupy the whole memory, and ascertained characteristic value memory addresses Ks, which are ascertained on the basis of poor amplitude values AM1, AM2, may lie outside of the valid address space.

The selected square wave signal R1, R2 can be examinable in a comparable manner, analogously according to FIG. 8 or digitally according to FIG. 9. Said examination can be based on amplitude values AR1, AR2 or on characteristic values E2.

The verification means 10 is able to read, especially on the basis of the characteristic value memory address Ks ascertained in the computing module 8, the content of this address in the memory unit 10.

A tenth embodiment is shown in FIG. 10; also in the case of this embodiment, elements which correspond to the elements of the embodiments according to the preceding figures with respect to function and structural design are designated by the same reference numerals. For the sake of brevity, features which are different from those of the embodiments according to the figures that have already been described will be discussed.

The coordinate system according to FIG. 8 is here shown once more. In addition, the sectors S1 to S4, which are delimited by sector boundaries 40, 41 and in which the amplitude value AR1, AR2 of a respective one of the square wave signals R1, R2 has to be examined, are shown. When the measuring signals M1, M2 of the measuring signal pair P1 are shifted in phase by 90° relative one another, the axes X, Y and the sector boundaries 40, 41 define an angle of 45°, the cosinoidal measuring signal M1 being here plotted on the X-axis and the sinusoidal measuring signal M2 on the Y-axis.

FIG. 11 shows an eleventh embodiment; in the case of this embodiment, elements which correspond to the elements of the embodiments according to the preceding figures with respect to function and structural design are designated by the same reference numerals. For the sake of brevity, the features which are different from those of the embodiments according to the figures that have already been described will be discussed.

Here, a table is shown, which illustrates the determination of the sectors S1 to S4 on the basis of the ratio of the amplitude values AM1, AM2 of the measuring signal pair P1. The sector boundaries 40 and 41 are determined by amplitude values AM1, AM2 of the measuring signal pair P1 which are absolutely equal or equal in terms of their absolute value. In order to be able to assign the sectors S1 to S4, it is here defined that the measuring signal M1 is converted into the square wave signal R1, said measuring signal M1 and said square wave signal R1 having the same frequency and being not shifted in phase relative to one another. The measuring signal M2 is converted into the square wave signal R2. The square wave signal R2 is not shifted in phase relative to the measuring signal M2 either, and both signals have the same frequency.

In sector 1, the absolute value of the amplitude value AM2 of the measuring signal M2 is smaller than the amplitude value AM1 of the measuring signal 1. In the thus defined sector 1, it is examined whether the amplitude value AR1 of the square wave signal R1 is larger than an upper quality value.

In sector 2, the magnitude of the amplitude value AM1 is smaller than the amplitude value AM2. In this sector it is examined whether the amplitude value AR2 is larger than an upper quality value.

In sector S3, the negative amplitude value AM1 is larger than the absolute value of the amplitude value AM2.

In sector S4, the negative absolute value of the amplitude value AM2 is larger than the amplitude value AM1. In this sector it is examined whether the amplitude value AR2 is smaller than a lower quality value.

The invention claimed is:

1. A method for checking the operability of a rotary encoder, the method comprising the steps of:
providing a rotary encoder with a sensor unit and with a monitoring unit;
operating the rotary encoder including making measurements with the sensor unit to provide a pair of measuring signals, the pair of measuring signals being shifted in phase relative to one another and being representative of an amount of rotation or an angular position sensed by the sensor unit;
with the monitoring unit, comparing the pair of measuring signals with reference information stored in the rotary encoder;

with the monitoring unit, combining amplitude values of the pair of measuring signals to form a characteristic value;

providing an association of characteristic values or characteristic value ranges with reference information, and storing the association in the rotary encoder as quality values which are representative of admissible amplitude value combinations;

with the monitoring unit, selecting a quality value for the formed characteristic value based on the stored association of characteristic values and reference information; and with the monitoring unit, generating a monitoring signal with a signal content in dependence upon the selected quality value and representative of the operability of the rotary encoder.

2. A method according to claim 1, wherein the characteristic value is formed from the measuring signal pair by an arithmetic function combination of the amplitude values.

3. A method according to claim 1, wherein:
the amplitude values of the measuring signal pair are squared to provide squared amplitude values; and
the squared amplitude values are added.

4. A method according to claim 1, wherein the quality value for a perfect rotary encoder is constant for all rotary angle values.

5. A method according to claim 1, wherein the amplitude values are digitized and used for addressing an at least two-dimensional characteristic diagram in which quality values are stored.

6. A method according to claim 5, further comprising:
providing a memory; and
storing the association of characteristic values and the quality values wherein the quality value is read from the memory based on an associated characteristic value memory address.

7. A method according to claim 6, wherein during rotary encoder operation, a predetermined minimum amount of rotary angle values are converted into characteristic values and that the characteristic values are collected and stored.

8. A method according to claim 7, wherein, during rotary encoder operation, quality values are determined in dependence upon a residence likelihood of the characteristic values.

9. A method according to claim 8, further comprising:
providing predetermined quality value limits; and
comparing the selected quality value with the predetermined quality value limits.

10. A method according to claim 9, further comprising:
generating square wave signals from the measuring signal pair;
providing one or more square wave quality values; and
comparing the generated square wave signals with the square wave quality value by selecting one of the square wave signals on a basis of predetermined amplitude ratios of the pair of measuring signals and by examining the amplitude value of this square wave signal in comparison with the square wave quality value.

11. A method according to claim 1, further comprising:
monitoring a temperature of a signal processing unit;
comparing the monitored temperature to a threshold temperature value; and
detecting a short circuit upon the monitored temperature exceeding a threshold temperature value.

12. A method according to claim 1, wherein the rotary encoder includes a processing unit and the method further comprises:

with the processing unit, providing an output in the form of a rotary encoder output representing an amount of rotation or an angular position detected by the rotary encoder based on the pair of measuring signals.

13. A rotary encoder comprising:
a sensor unit sensing an amount of rotation or an angular position and generating, during operation of the rotary encoder, at least one pair of sinusoidal measuring signals, which are shifted in phase relative to one another;
a monitoring unit connected to the sensor unit in a measuring signal-transmitting manner, the monitoring unit providing an output in the form of a monitoring signal representative of the operability of the rotary encoder, the monitoring unit comprising:
a computing module generating a characteristic value from amplitude values of the pair of measuring signals;
a memory unit with stored quality values and a stored association of characteristic values or characteristic value ranges with reference information, as the quality values which are representative of admissible amplitude value combinations;
a verification device selecting a quality value for the formed characteristic value based on the stored association of characteristic values and reference information; and
an alarm unit controlled in dependence upon the quality value selected by the verification device wherein the monitoring signal generated is based on the quality value selected.

14. A rotary encoder according to claim 13, wherein a signal output of the verification device is a verification signal which is representative of the result of the examination of the characteristic value in comparison with the quality value and which is supplied to the alarm unit.

15. A rotary encoder according to claim 13, wherein the monitoring signal, which depends on the verification signal, is adapted to be applied to the alarm unit.

16. A rotary encoder according to claim 13, further comprising a signal converter converting the measuring signals into square wave signals, said signal converter being connected to the sensor unit on an input side and being connected to the computing module or the verification device on an output side.

17. A rotary encoder according to claim 16, further comprising at least one signal comparison unit comparing the amplitude values of the measuring signals and/or comparing the square wave signals applied to the signal output with output signals of the sensor unit and/or output signals of a signal converter.

18. A rotary encoder according to claim 17, wherein the signal comparison unit is connected to the alarm unit to control the alarm unit.

19. A rotary encoder according to claim 13, further comprising an acceleration measuring device, wherein the acceleration measuring device is connected to the alarm unit to control the alarm unit.

20. A rotary encoder comprising:
a sensor unit sensing an amount of rotation or an angular position and generating, during operation of the rotary encoder, at least one pair of sinusoidal measuring signals, which are shifted in phase relative to one another and are representative of an amount of rotation or an angular position sensed by the sensor unit;
a processing unit connected to sensor unit in a measuring signal-transmitting manner, the processing unit providing an output in the form of a rotary encoder output representing an amount of rotation or an angular position detected by the rotary encoder based on the pair of measuring signals;

a monitoring unit connected to the sensor unit in a measuring signal-transmitting manner, the monitoring unit providing an output in the form of a monitoring signal representative of the operability of the rotary encoder, the monitoring unit comprising:

- a computing module generating a characteristic value from the combined amplitude values of the pair of measuring signals;
- a memory unit with stored quality values and a stored association of characteristic values or ranges of characteristic values with reference information, as the quality values which are representative of amplitude value combinations;
- a verification device selecting a quality value for the formed characteristic value based on the stored association of characteristic values and reference information; and
- a monitoring signal unit controlled in dependence upon the quality value selected by the verification device wherein the monitoring signal unit generates the monitoring signal.

* * * * *